(12) United States Patent
Lang et al.

(10) Patent No.: US 10,186,090 B2
(45) Date of Patent: Jan. 22, 2019

(54) METHOD AND DEVICE FOR DETERMINING A COLLISION CHARACTERISTIC OF A VEHICLE COLLISION

(71) Applicants: Robert Bosch GmbH, Stuttgart (DE); Monika Nitschke, Asperg (DE)

(72) Inventors: Gunther Lang, Stuttgart (DE); Dirk John, Korntal-Muenchingen (DE); Werner Nitschke, Asperg (DE); Simon Koenig, Stuttgart (DE); Mustafa Ajanovic, Sindelfingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/900,034

(22) PCT Filed: Jun. 17, 2014

(86) PCT No.: PCT/EP2014/062719
§ 371 (c)(1),
(2) Date: Dec. 18, 2015

(87) PCT Pub. No.: WO2014/202607
PCT Pub. Date: Dec. 24, 2014

(65) Prior Publication Data
US 2016/0140781 A1    May 19, 2016

(30) Foreign Application Priority Data

Jun. 18, 2013   (DE) .................. 10 2013 211 354

(51) Int. Cl.
*G07C 5/08*     (2006.01)
*B60R 21/0136*  (2006.01)
(Continued)

(52) U.S. Cl.
CPC ............ *G07C 5/08* (2013.01); *B60R 21/0136* (2013.01); *B60R 21/013* (2013.01); *B60R 21/0133* (2014.12); *B60R 2021/01204* (2013.01)

(58) Field of Classification Search
CPC . B60R 21/01; B60R 21/0136; B60R 21/0134; B60R 21/0132; B60R 21/0133;
(Continued)

(56) References Cited

U.S. PATENT DOCUMENTS 5,587,906 A * 12/1996 McIver ............... B60R 21/0132
                                                        180/282
6,219,606 B1 *  4/2001 Wessels ................ B60R 21/013
                                                        180/271
(Continued)

FOREIGN PATENT DOCUMENTS

DE         10141886      3/2003
DE        102005024319  12/2006
(Continued)

OTHER PUBLICATIONS

International Search Report for PCT/EP2014/062719, dated Sep. 10, 2014.

*Primary Examiner* — Thomas G Black
*Assistant Examiner* — Sara J Lewandroski
(74) *Attorney, Agent, or Firm* — Norton Rose Fulbright US LLP; Gerard Messina

(57) ABSTRACT

A method is provided for determining a collision characteristic of a vehicle collision for triggering safety means of the vehicle. The method has a step of an ascertainment of at least one determination-relevant time segment of a sensor signal representing the vehicle collision before a triggering time for a safety means. The method also has a step of a comparison of at least two features of the sensor signal in the at least one
(Continued)

time segment with one another in order to determine the collision characteristic.

5 Claims, 5 Drawing Sheets

(51) Int. Cl.
  *B60R 21/0132* (2006.01)
  *B60R 21/013* (2006.01)
  *B60R 21/01* (2006.01)
(58) Field of Classification Search
  CPC ............ B60R 21/01332; B60R 21/013; B60R 2021/01322; B60R 2021/01302; B60R 2021/01204; B60R 2021/01211; B60R 2021/01013; B60R 2021/01034; B60R 2021/01061; B60R 2021/01068
  USPC .................................................... 701/45–47
  See application file for complete search history.

(56) References Cited

U.S. PATENT DOCUMENTS

| | | | | |
|---|---|---|---|---|
| 6,430,489 | B1* | 8/2002 | Dalum ................ | B60R 21/0132 280/735 |
| 6,438,475 | B1* | 8/2002 | Gioutsos .............. | B60R 21/013 701/45 |
| 9,254,805 | B2* | 2/2016 | Park .................... | B60R 21/0136 |
| 2003/0222441 | A1* | 12/2003 | Andres ............... | B60R 21/0132 280/735 |
| 2005/0012312 | A1* | 1/2005 | Roelleke .............. | B60R 21/013 280/735 |
| 2008/0269991 | A1* | 10/2008 | Yamashita .......... | B60R 21/0132 701/45 |
| 2009/0037057 | A1* | 2/2009 | Sygnarowicz ..... | B60G 17/0163 701/46 |
| 2009/0276125 | A1* | 11/2009 | Brandmeier ......... | B60R 21/013 701/47 |
| 2011/0046853 | A1* | 2/2011 | Wieland .............. | B60R 21/013 701/45 |
| 2012/0072078 | A1* | 3/2012 | Oosaki .................. | B60R 25/00 701/46 |
| 2013/0090814 | A1* | 4/2013 | Berndt ............... | B60R 21/0132 701/46 |
| 2013/0253778 | A1* | 9/2013 | Park ................... | B60R 21/0136 701/45 |
| 2014/0277949 | A1* | 9/2014 | Ito ........................ | B60R 21/017 701/45 |
| 2016/0075294 | A1* | 3/2016 | Koenig ............... | B60R 21/0132 701/46 |

FOREIGN PATENT DOCUMENTS

| | | |
|---|---|---|
| DE | 102006056836 | 6/2008 |
| JP | H1128994 | 2/1999 |

* cited by examiner

METHOD AND DEVICE FOR DETERMINING A COLLISION CHARACTERISTIC OF A VEHICLE COLLISION

BACKGROUND INFORMATION

The present invention relates to a method for determining a collision characteristic of a vehicle collision for triggering safety means of the vehicle, to an apparatus for determining a collision characteristic of a vehicle collision for triggering safety means of the vehicle, and to a corresponding computer program product.

A detection of collisions, for example for airbag control devices of vehicles, is based on acceleration sensors. Triggering algorithms used to distinguish between cases of triggering and cases of non-triggering use for example an evaluation of signal features that in most cases are stronger in a case of triggering than in a case of non-triggering, in particular a strength of signals of such sensors. A trend toward lighter and shorter vehicles results for example in a harder front structure of these vehicles. This increases, in particular, signal amplitudes of sensor signals, for example in slow non-triggering situations against hard obstacles, in comparison with fast, triggering crashes against soft obstacles. Here, the signal features standardly used by such algorithms for characterizing the collision often supply results that are difficult to evaluate, for example with respect to effectiveness and informativeness in many cases of collision.

German Published Patent Application No 101 41 886 discloses a method for determining a triggering time for restraint means in a vehicle. Here, through formation of two time windows for the speed decrease in a crash, an increase in the speed decrease in the respective time windows, and a position of the time windows, are determined.

SUMMARY

Against this background, an improved method for determining a collision characteristic of a vehicle collision for triggering safety means of the vehicle, an improved device for determining a collision characteristic of a vehicle collision for triggering safety means of the vehicle, and an improved computer program product are presented according to the main claims. Advantageous embodiments result from the respective subclaims and from the following description.

According to specific embodiments of the present invention, a characterization of a vehicle collision can be realized by recognition of a shape property or shaping or a shape feature of a signal curve of a sensor signal. Thus, when there is a vehicle collision, in particular a recognition of a collision type can take place using the shape property of the collision curve in the sensor signal. Here, for example the sensor signal, and thus the collision curve, can be divided into different phases up to the required triggering time for safety means of the vehicle. Thus, the shape properties can be determined for example within one, several, or each phase, and/or in comparison of different phases. This enables in particular a division of a collision curve into elastic and inelastic phases, which permits inferences about the type of collision.

Advantageously, specific embodiments of the present invention enable a collision characteristic of a vehicle collision to be determined correctly, precisely, and reliably for a multiplicity of collision scenarios. Thus, in particular a change of a shaping or of the shape feature of an acceleration signal curve for collision characterization permits precise inferences about the present collision situation. Thus, a triggering algorithm can be optimized for a type of collision that is present, and safety means of the vehicle can be triggered in a more timely and robust fashion. The characteristic properties of the different collision types can be more clearly recognizable in shape properties of the signal curve than in conventional features based in particular on the signal strength. In particular in the case of collisions against a soft obstacle, where conventional features in the sensor signal are smaller or less marked than in non-triggering collisions, for example the shape properties can differ significantly from those in non-triggering situations.

An advantage of specific embodiments of the present invention is that in particular for hard front structures a more reliable, more accurate, and robust distinguishing or separation of triggering collisions and non-triggering collisions is enabled, which is becoming increasingly more difficult using conventional features. Here, in particular triggering collisions and non-triggering collisions can be correctly and appropriately recognized as such. In this way, for example an unnecessary triggering in the case of an actually present non-triggering collision, and a lack of triggering in the case of an actually present triggering collision, can be prevented. In this context, a triggering collision can be understood as a collision having a high degree of severity that justifies a triggering of safety means of the vehicle. A non-triggering collision can be understood as a collision having a low degree of severity that does not justify triggering of safety means of the vehicle.

A collision can be a physical impact having elastic and inelastic portions. Distribution and sequence of these portions can be characteristic of each type of collision. Elastic portions can for example correspond to a harmonic oscillation in the measured sensor signal or acceleration signal, while inelastic portions, or deformations, can be expressed for example as plateaus in the acceleration curve. For example, specific situations, in particular situations of misuse, depending on the collision recognition via the shaping of the collision curve, contain more elastic portions, e.g. hitting a pothole, or in the case of a collision object, e.g. a gravel pile or snowdrift, contain more inelastic portions.

Such scenarios as well can be reliably correctly recognized according to specific embodiments of the present invention.

A method for determining a collision characteristic of a vehicle collision for triggering safety means of the vehicle has the following steps:

ascertainment of at least one determination-relevant time segment of a sensor signal representing the vehicle collision before a triggering time for a safety means; and comparison of at least two features of the sensor signal in the at least one time segment with one another in order to determine the collision characteristic.

The vehicle can be a motor vehicle, in particular a street-bound motor vehicle such as a passenger car, a truck, or some other utility vehicle. The safety means can have at least one airbag, at least one safety belt, an adaptive crash structure, and/or at least one further safety means for protecting vehicle occupants and other traffic participants or those involved in the collision. In the case of a vehicle collision, the triggering time can be a time at which a safety means is to be triggered in order to carry out a safety function of the safety means. The sensor signal can be a signal provided by a sensor or a signal provided and preprocessed by a sensor. For example, such a signal can be provided by a sensor and processed by the sensor in order to obtain the sensor signal.

Alternatively, the signal can be provided by a sensor and can be pre-processed by a device connected after the sensor, for example a control device, in order to obtain the sensor signal. It is also possible for a part of the pre-processing to be carried out in the sensor and a further part of the pre-processing in a device connected after the sensor. Thus, the pre-processing can be realized not, or not exclusively, in the sensor, but rather for example in the control device. The method can include a step of reading in the sensor signal by an interface to a collision sensor or collision-relevant sensor, or by an interface to a pre-processing device. The vehicle can have the at least one collision sensor that is fashioned to output the signal that can be used as sensor signal for determining the collision characteristic, or that can be pre-processed to form the sensor signal. The collision sensor can be an acceleration sensor or the like. The collision characteristic can have an item of information regarding the collision type, the collision severity, and/or at least one further collision property. The collision characteristic is suitable for use as a decision criterion in the triggering of safety means of the vehicle. The method can also have a step of outputting a determination signal that represents the collision characteristic to an interface to safety means, and/or to a control device for safety means. The triggering of safety means can be brought about as a function of the determination signal.

According to a specific embodiment, in the step of ascertaining the sensor signal can be divided into the at least one time segment using a fixed time specification and, in addition or alternatively, a variable time specification. Here, the at least one time segment can have a fixed length or a variable length. If at least two time segments are ascertained in the sensor signal, such time segments can then have the same length or different lengths. Such a specific embodiment offers the advantage that the ascertainment of determination-relevant time segments can thus be carried out in an uncomplicated manner that is not computation-intensive.

In the step of ascertaining, the sensor signal can also be adaptively divided into the at least one time segment as a function of the signal property and, in addition or alternatively, a threshold value decision. For example, a time segment change can be ascertained if a signal property derived from the measured sensor signal exceeds or falls below a threshold value. Such properties can be for example the signal itself, the integrated signal, a signal gradient, a signal curvature, a relative signal increase, a turning point in the signal curve, and/or the like. A time segment change can also be ascertained if the signal curve departs from or returns to prespecified signal regions or ranges of expected values. For example, from an averaged or maximum signal gradient, a further signal rise can be extrapolated. If the signal rise falls relative to this extrapolation, or climbs compared thereto, a change of time segment is ascertained.

Such a specific embodiment offers the advantage that an event-controlled division of the sensor signal can be realized, which enables an ascertainment of time segments for the comparison step adapted more precisely to a particular collision situation. Here, the division of the sensor signal, or ascertained time segments, can advantageously depict individual collision phases in a particularly appropriate manner. Thus, the determination of the collision characteristic can take place with still more precision and correctness.

In addition, in the step of ascertainment the sensor signal can be divided into the at least one time segment as a function of a comparison of the sensor signal to a further signal. The further signal can be a signal filtered relative to the sensor signal, or conditioned in some other way, and in particular can also be a further sensor signal, for example from a different sensor than the sensor signal. In a representation of the sensor signal and of the further signal in a time diagram, the sensor signal can be divided into the at least one time segment as a function of at least one point of intersection of the sensor signal with the further signal. Such a specific embodiment offers the advantage that the ascertainment of determination-relevant time segments can take place particularly correctly and reliably, taking into account a further signal.

According to a specific embodiment, in the step of comparison shape-dependent features and, in addition or alternatively, time-dependent features of the sensor signal can be compared with one another. Such a specific embodiment offers the advantage that, using such features, the collision characteristic can be determined reliably and precisely.

In particular, in the comparison step signal strengths, integrals, time durations, curvatures, and/or rises can be compared with one another as features of the sensor signal. Such a specific embodiment offers the advantage that both a separation of hard triggering collisions from non-triggering situations, and also an effective detection of soft triggering collisions, in which the measured acceleration signal in the triggering-relevant time can be lower than in the strong non-triggering collisions. Thus, it is not necessary to use only features relating to the signal strength, and also the additional use of more complex signal features, combinations of features, or features based on additional sensor signals can be avoided.

In addition, in the step of comparison the at least one time segment can be divided into subsegments as a function of at least one threshold value. Here, features of the sensor signal from at least one subsegment of a time segment can be compared with one another. The threshold value can relate to a maximum signal strength, in particular a maximum signal strength in the particular time segment under consideration. Such a specific embodiment offers the advantage that even within an individual ascertained time segment, suitable features of the sensor signal can advantageously be compared with one another in order to determine the collision characteristic still more precisely through even finer division of the at least one time segment into subsegments.

In the step of comparison, an integral of the sensor signal in a subsegment and a product of a time duration of the subsegment and a threshold value can be compared with one another as the features of the sensor signal. If the sensor signal is shown in a time diagram, here an integral surface and a rectangular surface that includes at least the integral surface can be compared with one another. Such a specific embodiment offers the advantage that from such surfaces, and in particular from their relationships to one another, essential characteristics of the deformation process of the collision can be determined with particular correctness.

In the step of ascertaining, a plurality of time segments can also be ascertained. Here, in the comparison step features from different time segments can be compared with one another. Such a specific embodiment offers the advantage that a collision curve, and thus the collision characteristic, can be determined particularly reliably and correctly.

An apparatus for determining a collision characteristic of a vehicle collision for triggering safety means of the vehicle has the following features:

a device for ascertaining at least one determination-relevant time segment of a sensor signal representing the vehicle collision before a triggering time point for a safety means; and a device for comparing at least two features of the sensor signal in the at least one time segment with one another in order to determine the collision characteristic.

The above-named apparatus can advantageously be used in connection with a specific embodiment of the method for determination, in order to determine a collision characteristic of a vehicle collision for triggering safety means of the vehicle. The apparatus is fashioned to carry out or realize the steps of the method for determination in corresponding devices. Through this variant embodiment of the present invention in the form of an apparatus, the underlying object of the present invention can also be achieved quickly and efficiently.

An apparatus can be understood in the present case as an electrical piece of equipment, in particular a control device, that processes sensor signals and, as a function thereof, determines collision characteristics. The apparatus can have an interface that can be fashioned as hardware and/or as software. In the case of a realization as hardware, the interfaces can for example be part of a so-called system ASIC containing a wide variety of functions of the apparatus. However, it is also possible for the interfaces to be separate integrated circuits, or to be made up at least partly of discrete components. In the case of a realization as software, the interfaces can be software modules present for example on a microcontroller alongside other software modules.

Also advantageous is a computer program product having program code stored on a machine-readable carrier such as a semiconductor memory, a hard drive memory, or an optical memory, and used to carry out a method as named above for determining a collision characteristic of a vehicle collision for triggering safety means of the vehicle when the program is carried out on a computer or an apparatus.

DETAILED DESCRIPTION

Figure 1:
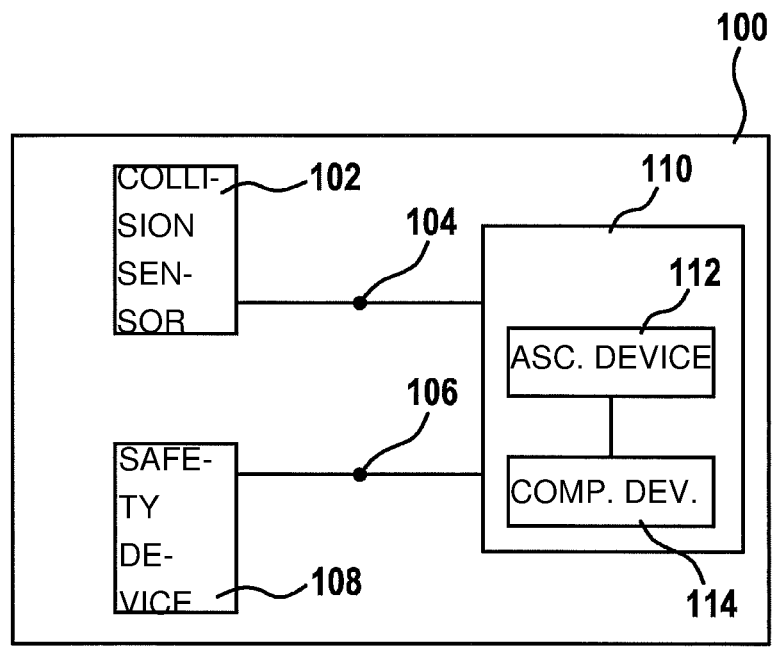
FIG. 1 shows a schematic representation of an apparatus for determination, according to an exemplary embodiment of the present invention.

In the following description of preferred exemplary embodiments of the present invention, identical or similar reference characters are used for the elements shown in the various Figures and having similar function, and repeated description of these elements is omitted.

FIG. 1 shows a schematic representation of a device for determining a collision characteristic of a vehicle collision for triggering safety means of the vehicle according to an exemplary embodiment of the present invention. Shown are a vehicle 100, an example of a collision sensor 102, a first interface 104, a second interface 106, safety means 108, an apparatus 110 for determination, or a determination apparatus, an ascertainment device 112, and a comparison device 114. Apparatus 110 for determination has ascertainment device 112 and comparison device 114. Apparatus 110 is connected via first interface 104 to collision sensor 102, and is connected via second interface 106 to safety means 108, so as to be capable of transmitting signals.

Collision sensor 102 is fashioned to produce and provide a sensor signal. The sensor signal can be used to acquire and to characterize a collision of vehicle 100. In the case of a collision of vehicle 100, the sensor signal represents the collision of vehicle 100. According to an exemplary embodiment of the present invention, collision sensor 102 includes an acceleration sensor. According to a further exemplary embodiment, collision sensor 102 has a plurality of sensor elements, the sensor elements being fashioned to acquire an acceleration and/or a surrounding environment of vehicle 100. According to an exemplary embodiment, a detection of front collisions takes place in an airbag control device using acceleration sensors that sense in the x direction, standardly configured centrally on a center tunnel of vehicle 100 and/or at positions on the vehicle periphery, e.g. symmetrically on both B pillars, etc.

Safety means 108 are fashioned to protect occupants of vehicle 100, and/or traffic participants in the area around vehicle 100, from the consequences of collisions. According to an exemplary embodiment, safety means 108 has at least one safety device, such as an airbag, a deformable front structure, and/or the like. According to an exemplary embodiment, safety means 108 has a control device for controlling or triggering the at least one safety device. According to an exemplary embodiment, apparatus 110 is part of safety means 108, in particular part of a control device for controlling or triggering the at least one safety device of safety means 108.

Apparatus 110 for determination is fashioned to determine a collision characteristic of a collision of vehicle 100 for the triggering of safety means 108 of vehicle 100. Apparatus 110 is fashioned to read in the sensor signal from first interface 104 to collision sensor 102. Ascertainment device 112 is fashioned to determine at least one determination-relevant time segment of the sensor signal before a triggering time for the safety means. Comparison device 114 is fashioned to compare at least two features of the sensor signal in the at least one ascertained time segment to one another in order to determine the collision characteristic. Apparatus 100 is also fashioned to send a determination signal that represents the determined collision characteristic to second interface 106 to safety means 108, in particular to the control device for safety means 108.

Safety means 108, in particular the control device of safety means 108, is fashioned to bring about the triggering of safety means 108 as a function of the determination signal of apparatus 110.

According to an exemplary embodiment, ascertainment device 112 is fashioned to divide the sensor signal into the at least one time segment using a fixed time specification and, additionally or alternatively, a variable time specification. According to an exemplary embodiment, ascertainment device 112 is fashioned to divide the sensor signal into the at least one time segment adaptively as a function of a signal property and, in addition or alternatively, of a threshold value decision. According to an exemplary embodiment, ascertainment device 112 is fashioned to divide the sensor signal into the at least one time segment as a function of a comparison of the sensor signal to a further signal.

According to an exemplary embodiment, comparison device 114 is fashioned to compare shape-dependent and, additionally or alternatively, time-dependent features of the sensor signal with one another. In particular, comparison device 114 is fashioned to compare signal strengths, integrals, time durations, curvatures, and, in addition or alternatively, rises to one another as features of the sensor signal. According to an exemplary embodiment, comparison device 114 is fashioned to divide the at least one time segment into subsegments as a function of at least one threshold value. Here, features of the sensor signal from at least one subsegment of a time segment are compared with one another. In particular, comparison device 114 is fashioned to compare an integral of the sensor signal in a subsegment and a product of a time duration of the subsegment and a threshold value to one another as the features of the sensor signal.

According to an exemplary embodiment, ascertainment device 112 is fashioned to ascertain a plurality of determination-relevant time segments of the sensor signal, and comparison device 114 is fashioned to compare features from different time segments of the sensor signal to one another.

Figure 2:
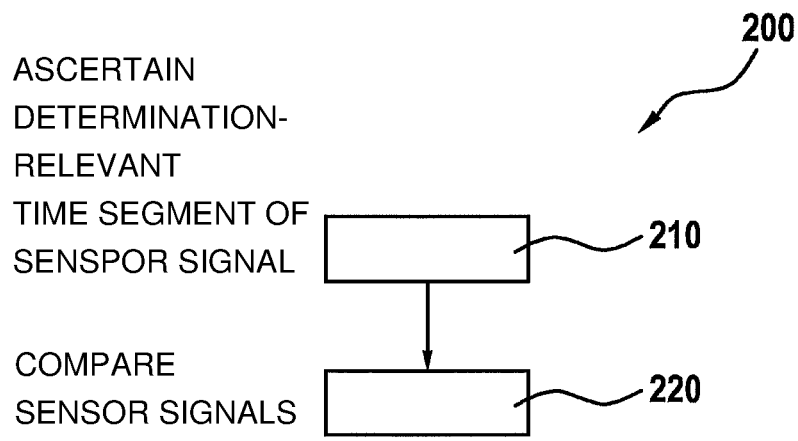
FIG. 2 shows a flow diagram of a method for determination according to an exemplary embodiment of the present invention.

FIG. 2 shows a flow diagram of a method 200 for determining a collision characteristic of a vehicle collision for triggering safety means of the vehicle according to an exemplary embodiment of the present invention. Method 200 can advantageously be carried out in connection with the determination apparatus, such as the determination apparatus, or apparatus for determination, of FIG. 1. Method 200 has a step 210 of ascertaining at least one determination-relevant time segment of a sensor signal representing the vehicle collision before a triggering time for a safety means. Method 200 also has a step 220 of comparison of at least two features of the sensor signal in the at least one time segment in order to determine the collision characteristic.

In other words, with reference to FIGS. 1 and 2, according to an exemplary embodiment of the present invention there thus takes place, for the determination of a collision characteristic, a shape evaluation of the sensor signal through a comparison between collision phases or time segments. Thus, the sensor signal representing the collision curve subdivides at least one time segment, or at least one phase, up to the required triggering time of the safety means. This takes place for example using ascertainment device 112 of apparatus 110 of FIG. 1, or in ascertainment step 210 of method 200 of FIG. 2. In addition, for each time segment, or each phase, of the sensor signal particular features M are determined. A sequence of such features, for example M1 from a time segment 1, M2 from a time segment 2, M3 from a time segment 3, is characteristic for the collision curve. Through suitable comparisons of the sequence of features M1, M2, M3, etc., the collision curve, and thus the collision type, is then determined, or reconstructed. This takes place for example using comparison device 114 of apparatus 110 of FIG. 1, or in comparison step 220 of method 200 of FIG. 2. The division of a sensor signal representing the collision curve into different time segments can take place using various methods, as shown and described in FIGS. 3A through 3E.

FIGS. 3A through 3E show sensor signal diagrams relating to the ascertainment of time segments according to exemplary embodiments of the present invention. The ascertainment of the time segments takes place using ascertainment device 112 of apparatus 110 of FIG. 1, or through an execution of step 210 of ascertainment of method 200 of FIG. 2.

Figure 3A:
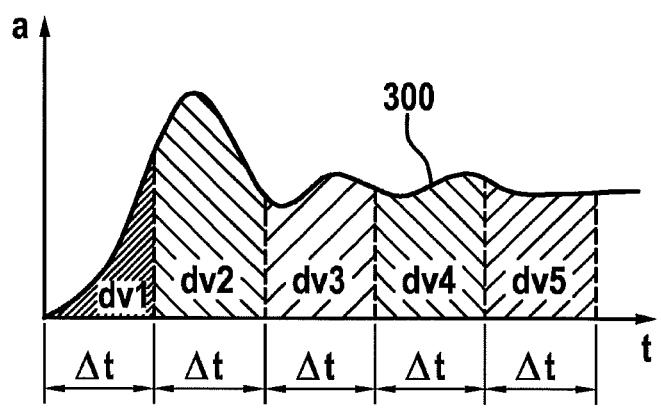
FIGS. 3A through 3E show sensor signal diagrams relating to the ascertainment of time segments according to exemplary embodiments of the present invention.

FIG. 3A shows a sensor signal diagram regarding the ascertainement of time segments according to an exemplary embodiment of the present invention. On the abscissa of the sensor signal diagram, time t is plotted, and on the ordinate of the sensor signal diagram an acceleration a is plotted, which can also alternatively be designated Acc. The acceleration can be the sensor measurement value of sensor 102, or also can be a quantity derived therefrom and preprocessed, e.g. a filtered or integrated acceleration. In the sensor signal diagram, a curve of acceleration a over time t is shown, the curve corresponding to a graphic representation of a sensor signal 300, such as the sensor signal of FIGS. 1 and 2. The curve, or sensor signal, 300 here represents an acceleration of a vehicle in the case of a vehicle collision in various collision phases. In addition, as an example five time segments $\Delta t$, and five partial integrals or partial integral surfaces dv1, dv2, dv3, dv4, dv5 are shown. Here, sensor signal 300 is divided as an example into the five time segments $\Delta t$. There thus result, due to the division into the exemplary five time segments $\Delta t$, the five partial integrals dv1, dv2, dv3, dv4, dv5 between sensor signal 300 and the abscissa of the sensor signal diagram.

In other words, FIG. 3A shows a division of the sensor signal into temporally separated, for example equidistant, time segments $\Delta t$. In particular, beginning from a start of an algorithm, sensor signal 300 can be divided into time segments or phases having the same duration, for example 8 ms. A division into variable time windows, e.g. a phase change after 5 ms, 8 ms, 12 ms, 18 ms, etc., is also conceivable. A characteristic criterion for each collision phase is for example the respective partial integral, or a partial surface, between sensor signal 300 and the abscissa. Through comparison of partial integrals dv1, dv2, dv3, dv4, dv5 and, possibly, further partial integrals, a shape, and thus a type of the vehicle collision, can be inferred.

Figure 3B:
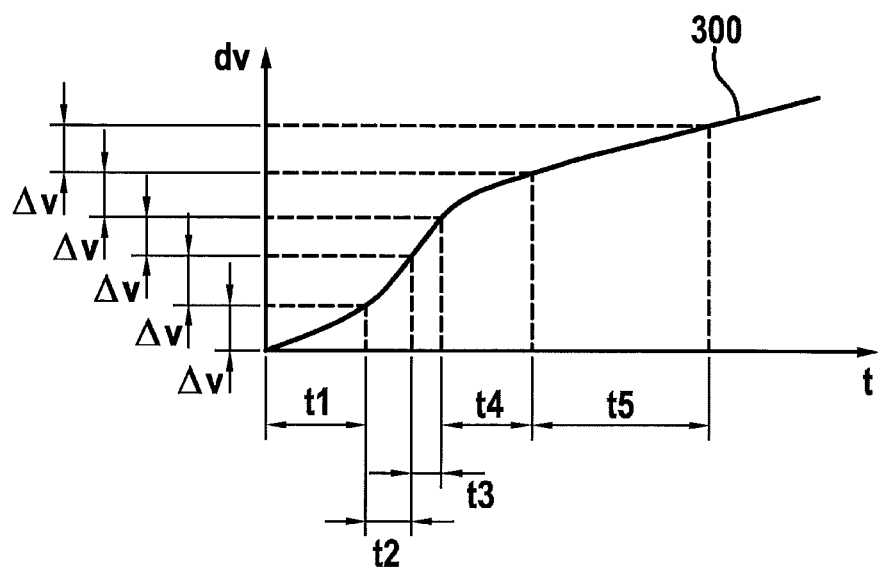

FIG. 3B shows a sensor signal diagram relating to the ascertainment of time segments according to an exemplary embodiment of the present invention. On the abscissa of the sensor signal diagram, time t is plotted, and on the ordinate of the sensor signal diagram a (possibly preprocessed) acceleration is plotted as change in speed dv. In the sensor signal diagram, a curve of the change in speed dv is shown over time t, the curve corresponding to a graphic representation of a sensor signal 300 such as the sensor signal from FIGS. 1 and 2. Curve or sensor signal 300 here represents a change in speed of a vehicle during a vehicle collision in various collision phases. In addition, for example five speed differences $\Delta v$ and five time segments t1, t2, t3, t4, and t5 are shown.

Here, sensor signal 300 on the ordinate of the sensor signal diagram is divided as an example into the five speed differences $\Delta v$. There thus result, due to the division into the for example five speed differences $\Delta v$, the five time segments t1, t2, t3, t4, and t5 on the abscissa of the sensor signal diagram. In particular, there results an adaptive subdivision of sensor signal 300 into different time segments t1, t2, t3, t4, and t5, or phases that are defined through for example equidistant threshold values or thresholds on speed differences $\Delta v$ as a derived signal feature, e.g. an integral. The criterion for the characterization of each time segment t1, t2, t3, t4, and t5 of sensor signal 300 is for example a time duration of the respective time segment. The sequence of the time durations of time segments t1, t2, t3, t4, and t5 permits the shape of the collision curve, and thus the collision type, to be inferred.

Figure 3C:
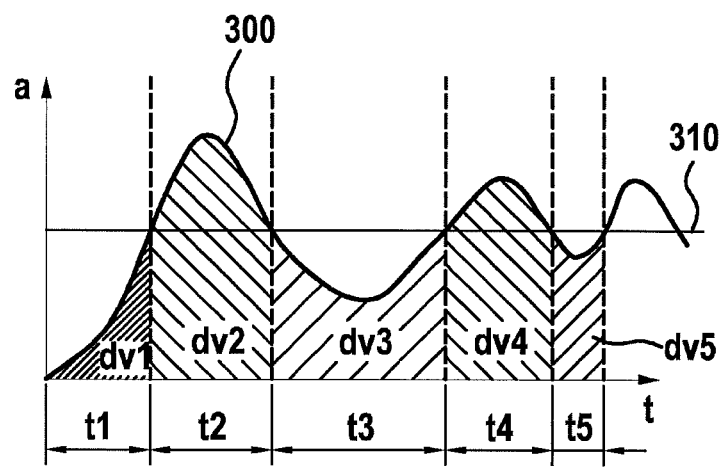

FIG. 3C shows a sensor signal diagram relating to the ascertainment of time segments according to an exemplary embodiment of the present invention. On the abscissa of the sensor signal diagram, time t is plotted, and on the ordinate of the sensor signal diagram an acceleration a (possibly preprocessed) is plotted. In the sensor signal diagram, a curve of acceleration a over time t is shown, the curve corresponding to a graphic representation of the sensor signal 300 such as the sensor signal of FIGS. 1 and 2. The curve, or sensor signal 300, here represents an acceleration of a vehicle during a vehicle collision in various collision phases. In addition, as an example five time segments t1, t2, t3, t4, and t5 and five partial integrals, or partial integral surfaces, dv1, dv2, dv3, dv4 and dv5 are shown. In addition, a reference threshold 310 is shown as a parallel to the abscissa. Sensor signal 300 is subdivided into time segments t1, t2, t3, t4, and t5 by or at points of intersection of sensor signal 300 with reference threshold 310. A change from one time segment to a next time segment this takes place at, for example, each point of intersection of sensor signal 300 with reference threshold 310. Thus, the five partial integrals dv1, dv2, dv3, dv4 and dv5 between sensor signal 300 and the abscissa of the sensor signal diagram result from the subdivision into the for example five time segments t1, t2, t3, t4, and t5.

In other words, in FIG. 3C there takes place an adaptive division of sensor signal 300 into different time segments t1, t2, t3, t4, and t5, defined through the exceeding and falling below of reference threshold 310 of a feature which here for example is an acceleration signal or filtered acceleration signal. Criteria for characterizing each time segment t1, t2, t3, t4, and t5 are in particular a time duration or a partial integral of the respective time segment. A sequence of the time durations of time segments t1, t2, t3, t4, and t5, or a sequence of partial integrals dv1, dv2, dv3, dv4 and dv5, enables inferences to be made concerning a shape of the collision curve and thus a type of collision.

With reference to FIGS. 3B and 3C, exemplary embodiments are thus shown for an event-controlled or adaptive division of sensor signal 300 into various time segments t1, t2, t3, t4, and t5 or phases. In other words, this is an event-controlled or adaptive ascertainment of time segments t1, t2, t3, t4, and t5 that are relevant for determining a collision characteristic. For example, a time segment change or phase change can be determined when a signal feature derived from measured sensor signal 300 exceeds or falls below a particular threshold value. Such a signal feature can be for example the signal itself, the integrated signal, a signal gradient, a signal curvature, a relative signal rise, etc. According to a further exemplary embodiment, a time segment change is defined by a turning point or zero transition of the second derivative in the signal curve of sensor signal 300.

Figure 3D:
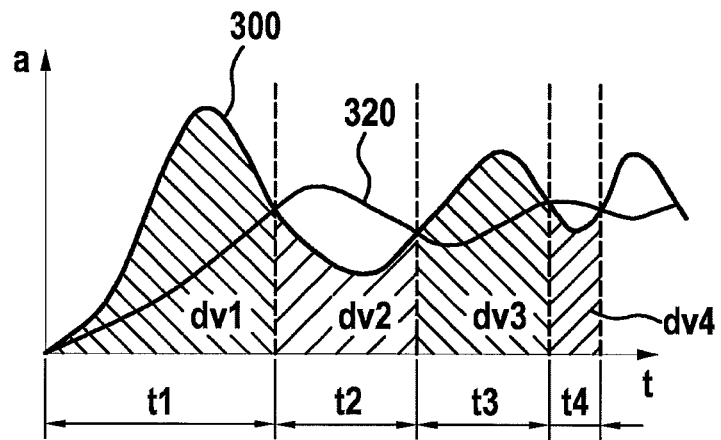

FIG. 3D shows a sensor signal diagram relating to the ascertainment of time segments according to an exemplary embodiment of the present invention. On the abscissa of the sensor signal diagram, time t is plotted, and on the ordinate of the sensor signal diagram an acceleration a (possibly preprocessed) is plotted. In the sensor signal diagram, a curve of the acceleration a over time t is shown, the curve corresponding to a graphic representation of a sensor signal 300 such as the sensor signal of FIGS. 1 and 2. The curve, or sensor signal 300, here represents an acceleration of a vehicle during a vehicle collision in various collision phases. In addition, as an example four time segments t1, t2, t3, and t4, and four partial integrals, or partial integral surfaces, dv1, dv2, dv3, and dv4 are shown. In addition, a further signal 320 is shown. This signal can either be a signal of a further sensor or can be a feature derived from signal 300 through further pre-processing, e.g. a more strongly filtered signal 300. Sensor 300 is divided into time segments t1, t2, t3, and t4 using, or at, points of intersection of sensor signal 300 with further signal 320. A change from one time segment to a next time segment thus takes place at, as an example, each point of intersection of sensor signal 300 with further signal 320. The four partial integrals dv1, dv2, dv3, and dv4 between sensor signal 300 and the abscissa of the sensor signal diagram thus result from the division into the for example four time segments t1, t2, t3, and t4.

In other words, FIG. 3D shows an adaptive division of sensor signal 300 into different time segments t1, t2, t3, and t4. Time segments t1, t2, t3, and t4 are for example defined on the basis of points of intersection through superposition or crossing of two differently strongly filtered signals, sensor signal 300 and further signal 320. Criteria for characterizing each time segment t1, t2, t3, and t4 are for example a time duration or a partial integral of the respective time segment. According to the exemplary embodiment of the present invention shown in FIG. 3D, for the ascertainment of determination-relevant time segments for determining the collision characteristic, a comparison of two filtered signals with different time constant is thus carried out, points of intersection between the signals yielding the time segment division.

Figure 3E:
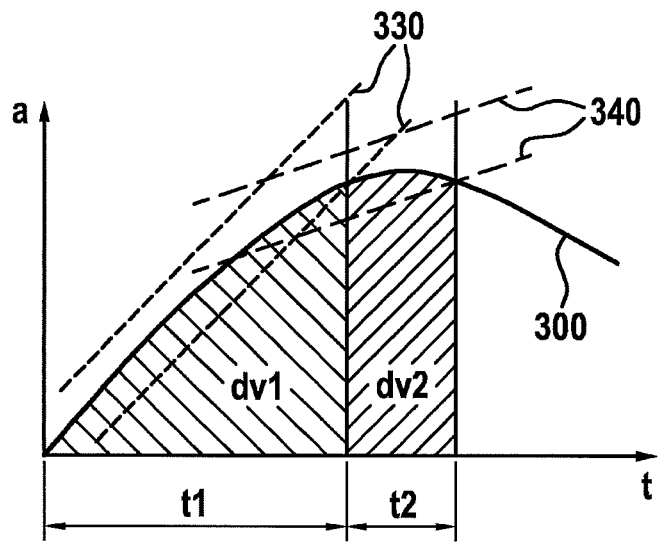

FIG. 3E shows a sensor signal diagram relating to the ascertainment of time segments according to an exemplary embodiment of the present invention. On the abscissa of the sensor signal diagram, time t is plotted, and on the ordinate of the sensor signal diagram an acceleration a is plotted. In the sensor signal diagram, a curve of acceleration a over time t is shown, the curve corresponding to a graphic representation of a sensor signal 300, such as the sensor signal of FIGS. 1 and 2. The curve, or sensor signal 300, here represents an acceleration of a vehicle during a vehicle collision in various collision phases. In addition, as examples two time segments t1 and t2, as well as two partial integrals or partial integral surfaces dv1 and dv2, are shown. Here, sensor signal 300 is as an example divided into the two time segments t1 and t2. The two partial integrals dv1 and dv2 between sensor signal 300 and the abscissa of the sensor signal diagram thus result from the division into the for example two time segments t1 and t2.

According to the exemplary embodiment shown in FIG. 3E of the present invention, the division of sensor signal 300 into time segments t1 and t2 takes place using for example two ranges of expected values 330 and 340. A range of expected values 330, 340 is defined for example via an extrapolation of an average or maximum gradient of sensor signal 300. If sensor signal 300 departs from a first range of expected values 330, first time segment t1 ends and a further range of expected values 340 is defined. Upon departure from this further range of expected values 340, second time segment t2 ends. Criteria for characterizing each time segment t1 and t2 are for example a time duration or a partial integral of the respective time segment. In other words, in this way there takes place a division of sensor signal 300 into time segments, or crash phases, as soon as the signal curve of sensor signal 300 departs from specified signal regions or ranges of expected values 330, 340, or returns to them. For example, from an averaged or maximum signal gradient of sensor signal 300 for producing ranges of expected values 330, 340, extrapolation to a further signal rise takes place. If the signal rise decreases relative to this extrapolation, or increases compared thereto, a new time segment is ascertained, or, if warranted, a new crash phase is reached.

In the ascertained time segments, for example the time segments or crash phases defined in one of FIGS. 3A through 3E, equivalent features M can now be acquired. These are for example a maximum or minimum signal value, an integrated signal (dv1, dv2, dv3, . . . ), a time duration (t1, t2, t3, . . . ), an averaged signal value of each time segment, etc. These equivalent features from for example each time segment (M1, M2, M3, . . . ) are for example now compared with one another, enabling inferences to a rough shape of the signal curve of sensor signal 300, and thus determination of the collision characteristic.

The comparison of the features takes place using comparison device 114 of apparatus 110 of FIG. 1, or by executing comparison step 220 of method 200 of FIG. 2.

For example, a ratio of the integral in a second time segment to the integral in a first time segment, a ratio of the integral in a third time segment to the integral in the second time segment, etc., can be evaluated. Such ratios enable statements concerning whether a braking in the course of the collision becomes stronger or weaker. In the latter case, there is a high probability that a situation of misuse is present. In principle, a ratio can be evaluated in various ways, e.g. by querying a corresponding quotient relative to a threshold or threshold value Thd, e.g. M2/M1>Thd, that is, whether the quotient is greater than the threshold value, or by avoiding the division in the form M2>M1*Thd, or by generalization in the form M2>Thd(M1), where the threshold value is formed as a function of M1, etc.

According to an exemplary embodiment, a comparison of features, or a shape evaluation, is provided within a time segment of sensor signal 300, or a crash phase. In particular, here as an example each individual time segment is evaluated in itself with regard to features relating to its shape in order to determine the collision characteristic. For example, for this purpose signal values are present in stored form, e.g. in a sufficiently large ring buffer. According to an exemplary embodiment, here at the end of a time segment the shape of sensor signal 300 in this time segment is determined retroactively.

FIGS. 4A through 4D show sensor signal diagrams relating to the comparison of features according to exemplary embodiments of the present invention.

Figure 4A:
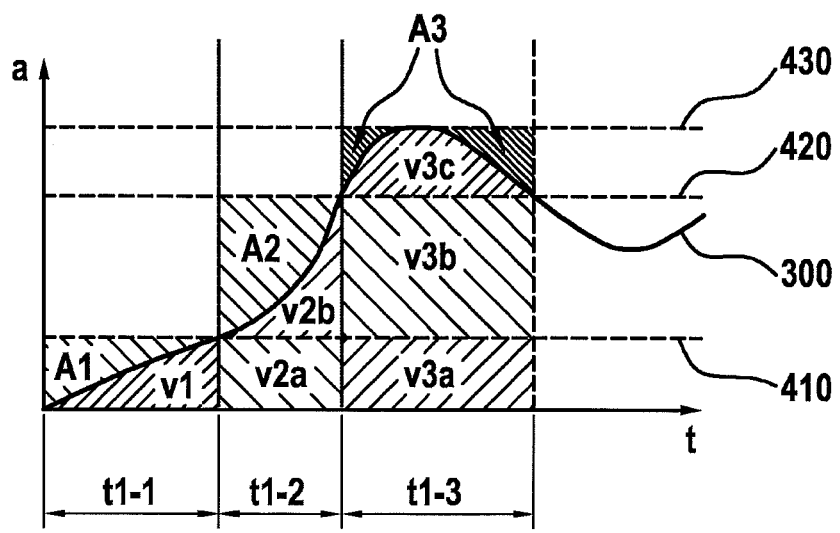
FIGS. 4A through 4D show sensor signal diagrams relating to the comparison of features according to an exemplary embodiment of the present invention.

FIG. 4A shows a sensor signal diagram relating to the comparison of features according to an exemplary embodiment of the present invention. On the abscissa of the sensor signal diagram, time t is plotted, and on the ordinate of the sensor signal diagram an acceleration a is plotted. In the sensor signal diagram, a curve of the acceleration a over time t is shown, the curve corresponding to a graphic representation of a sensor signal 300, such as the sensor signal of FIGS. 1 and 2, or 3A through 3E. The curve or sensor signal 300 here represents an acceleration of a vehicle during a vehicle collision in various collision phases. In addition, as an example three subsegments t1-1, t1-2, and t1-3 are shown of a time segment or collision phase of sensor signal 300. Also shown are surfaces A1, A2, A3, V1, V2a, V2b, V3a, V3b, and V3c, as well as, as examples, three threshold values 410, 420, and 430 as lines parallel to the abscissa of the sensor signal diagram.

For the comparison of features, sensor signal 300 is temporally divided into the, for example, three subsegments t1-1, t1-2, and t1-3. Third threshold value 430 corresponds to a maximum value of sensor signal 300 in the sensor signal diagram, in particular in the time region of sensor signal 300 shown in FIG. 4A. Thus, third threshold value 430 corresponds to a maximum acceleration value of a collision curve in the time region of sensor signal 300 shown in FIG. 4A. First threshold value 410 is for example 25 percent of the maximum value of sensor signal 300, or of third threshold value 430. Second threshold value 420 is for example 75 percent of the maximum value of sensor signal 300 or of third threshold value 430. Thus, for the comparison of features sensor signal 300 is divided by threshold values 410, 420, and 430 in the sensor signal diagram, also with regard to acceleration values.

In particular, FIG. 4A shows a phase of sensor signal 300 in a case of collision that can be retroactively evaluated at its end. For the comparison of features, or to determine a collision characteristic, the signal curve of sensor signal 300 is thus divided into subsegments t1-1, t1-2, and t1-3, or subphases, by defining relative threshold values. A first subsegment t1-1 corresponds for example to a beginning of the collision up to the reaching of for example 25 percent of the maximum value reached in FIG. 4A of the acceleration or of sensor signal 300. First subsegment t1-1 describes for example a deformation of soft components, such as a bumper foam of a vehicle. A second subsegment t1-2 describes the signal rise from 25 percent to 75 percent of the achieved maximum. This represents for example a force level rise in the case of an elastic deformation of hard vehicle structures, such as a bumper crossmember.

A third subsegment t1-3 describes a region around the signal maximum, from the exceeding of the second threshold value 420 in a rising flank up to the falling below of the second threshold value 420 in the falling flank. This is for example the region of the plastic deformation of hard vehicle structures such as the bumper crossmember. Based on this adaptive division into subsegments t1-1, t1-2, and t1-3, for example the time durations of the subsegments are determined.

According to an exemplary embodiment, a division into a different number of threshold values is also conceivable, for example four or five threshold values, e.g. having values of 15 percent, 30 percent, 70 percent, and 85 percent of the signal maximum.

In FIG. 4A, surfaces A1, A2, and A3 each represent surfaces outside a region between sensor signal 300 and the abscissa of the sensor signal diagram. Surface A1 corresponds to a region between sensor signal 300 and first threshold value 410 in first subsegment t1-1. Surface A2 corresponds to a region between sensor signal 300 and second threshold value 420 in second subsegment t1-2. Surface A3 corresponds to a region between sensor signal 300 and third threshold value 430 in third subsegment t1-3.

In addition, surfaces V1, V2, V2b, V3a, V3b, and V3c represent partial integrals of sensor signal 300, and thus represent surfaces within the region between sensor signal 300 and the abscissa of the sensor signal diagram. Surface V1 corresponds to the integral or partial integral of sensor signal 300, i.e. a region between sensor signal 300 and the abscissa of the sensor signal diagram, in first subsegment t1-1. Surfaces V2a and V2b correspond to the integral or partial integral of sensor signal 300, i.e. to a region between sensor signal 300 and the abscissa of the sensor signal diagram, in second subsegment t1-2. Here, surface V2a corresponds to a rectangular surface between the abscissa of the sensor signal diagram and first threshold value 410 in second subsegment t1-2, surface V2b corresponding to a surface between first threshold value 410 and sensor signal 300 in second subsegment t1-2. Surfaces V3a, V3b, and V3c correspond to the integral or partial integral of sensor signal 300, i.e. to a region between sensor signal 300 and the abscissa of the sensor signal diagram, in third subsegment t1-3. Here, surface V3a corresponds to a rectangular surface between the abscissa of the sensor signal diagram and first threshold value 410 in third subsegment t1-3, surface V3*b* corresponding to a rectangular surface between first threshold value 410 and second threshold value 420 in third subsegment t1-3, surface V3*c* corresponding to a surface between second threshold value 420 and sensor signal 300 in third subsegment t1-3.

In other words, FIG. 4A thus shows a division of a time segment or a phase of an energy release in a collision into subphases, and segment surfaces derived therefrom. From the time durations of the subsegments, and in particular from their ratios to one another, essential properties of the deformation process of the collision can now be derived. By comparing the time durations of plastic subsegment t1-3 and elastic subsegment t1-2, it can for example be inferred whether a collision process is predominantly plastic or elastic. Suitable comparisons of time durations are for example the ratio of t1-3 to t1-2, or the ratio of the sum of t1-2 and t1-3 to t1-2. In addition, a ratio of the time durations of t1-2 to t1-1 is for example a criterion for a ratio of the deformation path with rising force level, here t1-2, to the deformation path of soft structures having a low force level, here t1-1, and thus a criterion for the collision type. Each time duration of subsegments t1-1, t1-2, or t1-3 is a criterion of a speed with which a respective deformation process occurs, and thus permits a speed of the collision to be inferred.

According to an exemplary embodiment, surfaces under or above that of sensor signal 300 are determined and are used for the comparison of features. An integral or decrease in speed during the first subsegment t1-1 is designated V1. An integral or decrease in speed during second subsegment t1-2 is designated V2, and results as V2=V2*a*+V2*b*. An integral or decrease in speed during third subsegment t1-3 is designated V3, and results as V3=V3*a*+V3*b*+V3*c*. From such surfaces, and in particular from their ratios to one another, essential properties of the deformation process can also be derived. For example, as a measure of a plasticity of a collision, the decrease in speed of the plastic subsegments and the decrease in speed of the elastic subsegments can be compared with one another. This takes place in particular via the ratios V3/V2, (V2+V3)/V2, (V2+V3)/V3, (V3-V2)/V2, etc. In addition, for example a curvature of a rising flank of sensor signal 300 is evaluated via the ratio A2/V2*b*, and in particular provides inferences concerning whether in the plastic phase a component, or a plurality of components, are deformed with increasing force level.

Figure 4B:
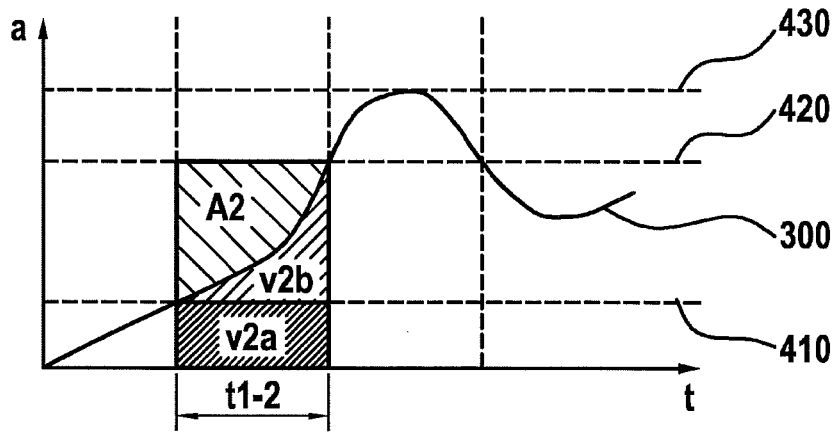
Figure 4C:
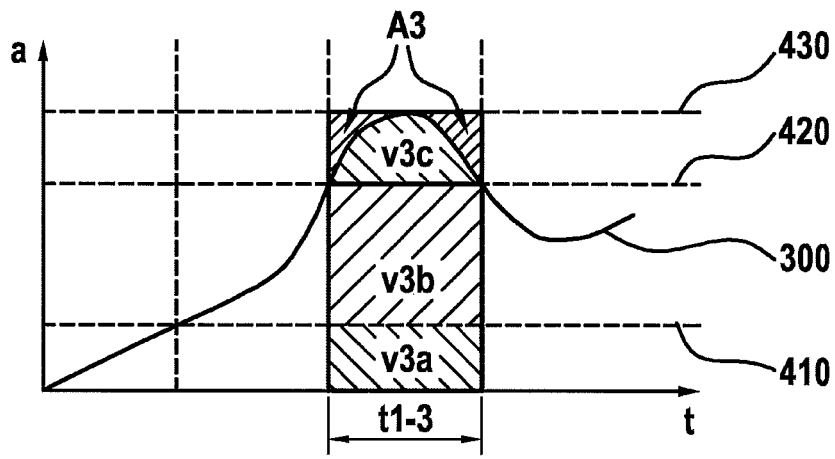
Figure 4D:
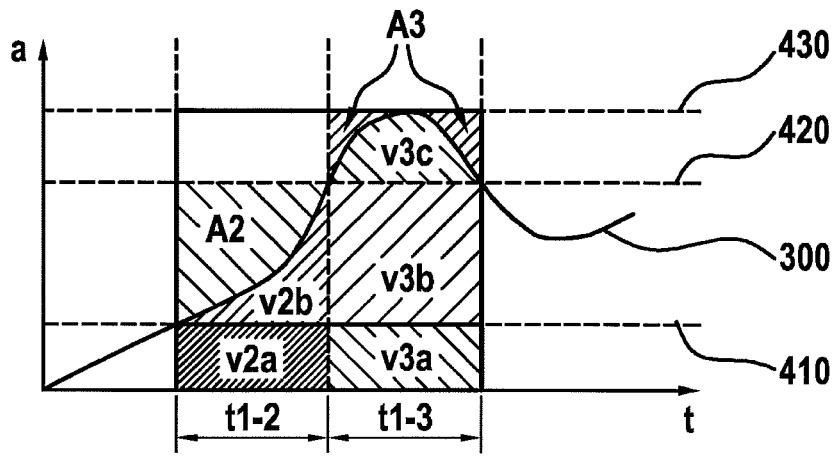

FIGS. 4B through 4D show parts of the sensor signal diagram of FIG. 4A. In particular, FIGS. 4B and 4C illustrate a separate shape evaluation of second subsegment t1-2 and of third subsegment t1-3 through comparison of partial surfaces with rectangular surfaces. FIG. 4D illustrates a combined shape evaluation of second subsegment t1-2 and third subsegment t1-3.

The representation in FIG. 4B corresponds to that of FIG. 4A, with the exception that of the surfaces, only surfaces A2, V2*a*, and V2*b* of second subsegment t1-2 are shown. In FIG. 4B it can be seen that surfaces A2 and V2*b* combine to form a rectangular surface defined by the limits of second subsegment t1-2 and first threshold value 410, as well as second threshold value 420. This rectangular surface is also designated R2*b*. For example for the comparison of features or the determination of the collision characteristic, the ratio A2/R2*b* or V2*b*/R2*b* is examined. In particular, the overall integral V2 is set into relation with a further rectangular surface that results from the surfaces A2, V2*b*, and V2*a*. These are mathematically equivalent variants.

The representation in FIG. 4C corresponds to that of FIG. 4A, with the exception that of the surfaces, only surfaces A3, V3*a*, V3*b*, and V3*c* of third subsegment t1-3 are shown. In FIG. 4C it can be seen that surfaces A3 and V3*c* combine to form a rectangular surface defined by the limits of third subsegment t1-3 and third threshold value 430, as well as second threshold value 420. This rectangular surface is also designated R3*c*. For example for the comparison of features or the determination of the collision characteristic, in addition or alternatively to the ratio A3/V3*c* the ratio A3/R3*c* or V3*c*/R3*c* is also examined. In particular, the overall integral V3 is set into relation with a further rectangular surface that results from the surfaces A3, V3*c*, V3*b*, and V3*a*. These are mathematically equivalent variants. Thus, for example a flattened or pointed signal shape is identified through comparison of the surfaces A3 and V3*c*. The ratio of surfaces V1 and V2 permits a collision geometry to be inferred.

The representation in FIG. 4D corresponds to that of FIG. 4A, with the exception that of the surfaces only surfaces A2, V2*a*, and V2*b* of second subsegment t1-2, as well as surfaces A3, V3*a*, V3*b*, and V3*c* of third subsegment t1-3, are shown. For example for the comparison of features or the determination of the collision characteristic, a combined surface of integral surfaces V2*b*, V3*b*, and V3*c* is set into relation to a rectangular surface that is limited by third threshold value 430 and by first threshold value 410 and that extends completely over second subsegment t1-2 and third subsegment t1-3. In particular, a decrease in speed in second subsegment t1-2 and in third subsegment t1-3, i.e. V2 and V3, or V2*a*, V2*b*, V3*a*, V3*b*, and V3*c*, is set into relation to a further rectangular surface that is limited by third threshold value 430 as well as the abscissa, and that extends completely over second subsegment t1-2 and third subsegment t1-3. For example, a combined shape of second subsegment t1-2 and third subsegment 1-3 is evaluated by setting a combined surface of integral surfaces V2*b*, V3*b*, and V3*c* into relation to a still further rectangular surface that is limited by third threshold value 430 and by first threshold value 410, and that extends completely over second subsegment t1-2 and third subsegment t1-3.

In summary, and with reference to FIGS. 1 through 4D, in particular the inferences thus obtained concerning the shapes of sensor signal 300 that are characteristic for the particular collision types are advantageously used to influence a triggering algorithm for safety means 108 of vehicle 100, for example the sensitivity of the algorithm. This can take place with regard to the triggering of safety means 108 for example through influencing of a threshold level, "add-on design," or through a changeover to other triggering conditions adapted to a present collision type ("path design").

The exemplary embodiments described and shown in the Figures have been selected only as examples. Different exemplary embodiments can be combined with one another in their entirety or with regard to individual features. An exemplary embodiment can also be supplemented with features of a further exemplary embodiment. In addition, method steps can be repeated, and can be executed in a sequence differing from that described.

What is claimed is:

1. A method for determining a collision characteristic of a vehicle collision for triggering a safety device of a vehicle, the method comprising:
   ascertaining at least one determination-relevant time segment of a sensor signal representing the vehicle collision before a triggering time for the safety device, the sensor signal representing one of a signal provided by a sensor and a signal provided and preprocessed by the sensor; and comparing at least two different type features of the sensor signal in the at least one time segment with one another to determine the collision characteristic;

wherein the comparing includes:
subdividing the at least one time segment into subsegments as a function of at least one threshold value, and comparing features of the sensor signal from at least one subsegment of the at least one time segment with one another, and wherein the comparing includes comparing an integral of the sensor signal in a subsegment with a product of a time duration of the subsegment and a threshold value as the features of the sensor signal.

2. The method as recited in claim 1, wherein the ascertaining includes subdividing the sensor signal adaptively as a function of at least one of a signal property and a threshold value decision into the at least one time segment.

3. The method as recited in claim 1, wherein the ascertaining includes subdividing the sensor signal into the at least one time segment as a function of a comparison of the sensor signal with a further signal.

4. An apparatus for determining a collision characteristic of a vehicle collision for triggering a safety device of a vehicle, comprising:

an arrangement for ascertaining at least one determination-relevant time segment of a sensor signal representing the vehicle collision before a triggering time for the safety device, the sensor signal representing one of a signal provided by a sensor and a signal provided and preprocessed by the sensor; and an arrangement for comparing at least two different type features of the sensor signal in the at least one time segment with one another to determine the collision characteristics;

wherein the comparing includes: subdividing the at least one time segment into subsegments as a function of at least one threshold value, comparing features of the sensor signal from at least one subsegment of the at least one time segment with one another, and comparing an integral of the sensor signal in a subsegment with a product of a time duration of the subsegment and a threshold value as the features of the sensor signal.

5. A non-transitory computer readable medium having a computer program, which is executable by a processor, comprising:

a program code arrangement having program code for determining a collision characteristic of a vehicle collision for triggering a safety device of a vehicle, by performing the following:

ascertaining at least one determination-relevant time segment of a sensor signal representing the vehicle collision before a triggering time for the safety device, the sensor signal representing one of a signal provided by a sensor and a signal provided and preprocessed by the sensor; and comparing at least two different type features of the sensor signal in the at least one time segment with one another to determine the collision characteristic;

wherein the comparing includes: subdividing the at least one time segment into subsegments as a function of at least one threshold value, comparing features of the sensor signal from at least one subsegment of the at least one time segment with one another, and comparing an integral of the sensor signal in a subsegment with a product of a time duration of the subsegment and a threshold value as the features of the sensor signal.

* * * * *